United States Patent
Malik et al.

(10) Patent No.: US 6,747,424 B1
(45) Date of Patent: Jun. 8, 2004

(54) INTEGRATED FAN SPEED CONTROL AND FAULT DETECTION CIRCUITRY

(75) Inventors: Randhir S. Malik, Cary, NC (US); William Hemena, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 09/678,408

(22) Filed: Oct. 2, 2000

(51) Int. Cl.$^7$ .............................................. H02P 6/08
(52) U.S. Cl. .................. 318/254; 318/434; 318/432; 417/44.11; 340/648
(58) Field of Search ................... 318/138, 254, 318/432, 434, 439, 461, 471, 472, 473, 811; 417/22, 44.11; 340/635, 648; 324/510, 511; 327/18, 20, 77

(56) References Cited

U.S. PATENT DOCUMENTS

| 4,427,931 A |   | 1/1984  | Tsukihashi |          |
|-------------|---|---------|------------|----------|
| 4,675,584 A |   | 6/1987  | Kurosawa   |          |
| 4,845,379 A | * | 7/1989  | Carlsten   | 327/20   |
| 4,977,375 A | * | 12/1990 | Toth       | 324/511  |
| 5,040,235 A |   | 8/1991  | Miyazaki   |          |
| 5,230,035 A |   | 7/1993  | Spring     |          |
| 5,534,854 A | * | 7/1996  | Bradbury et al. | 340/648 |
| 5,664,048 A |   | 9/1997  | Niemi et al. |        |
| 5,727,928 A | * | 3/1998  | Brown      | 417/44.11 |
| 5,889,469 A | * | 3/1999  | Mykytiuk et al. | 318/434 |
| 5,942,866 A |   | 8/1999  | Hsieh      |          |
| 5,990,582 A |   | 11/1999 | Henderson et al. |    |
| 6,040,668 A | * | 3/2000  | Huynh et al. | 318/741 |
| 6,135,718 A | * | 10/2000 | Yang       | 318/471  |
| 6,285,146 B1 | * | 9/2001 | Harlan     | 318/254  |

FOREIGN PATENT DOCUMENTS

| EP | 0671810 | 9/1995 |
| JP | 5706588 | 1/1982 |
| JP | 1069288 | 3/1989 |

* cited by examiner

*Primary Examiner*—Khanh Dang
(74) *Attorney, Agent, or Firm*—Sawyer Law Group LLP

(57) ABSTRACT

Aspects for integrating speed control and fault detection in a fan assembly are described. The aspects include a fan, a first circuit is coupled to the fan for regulating speed of the fan, and a second circuit coupled to the fan and to the first circuit for detecting a fault condition in the fan. A ripple regulator is integrated as the first circuit, and a pulse missing detector circuit is integrated as the second circuit.

16 Claims, 1 Drawing Sheet

INTEGRATED FAN SPEED CONTROL AND FAULT DETECTION CIRCUITRY

FIELD OF THE INVENTION

The present invention relates to speed control and fault detection in fan assemblies.

BACKGROUND OF THE INVENTION

A fan is a standard component in most commercial personal computers (PCs). The function of the fan is to provide thermal cooling to the integrated circuits and other components in the PC. A lack of cooling in a PC and other forms of electronic systems can cause premature failure in the circuits and/or components, which is detrimental to proper system operation and results in the need for costly repair/replacement of the system. Thus, it is important to ensure proper fan operation, both by maintaining proper fan speed and detecting fan failures, in order to avoid the detrimental effects of inadequate thermal cooling.

Accordingly, a need exists for an integrated, efficient and straightforward system for controlling fan speed and monitoring for fan failure that can be implemented with existing fan assemblies. The present invention addresses such a need.

SUMMARY OF THE INVENTION

The present invention provides aspects for integrating speed control and fault detection in a fan assembly. The aspects include a fan, a first circuit is coupled to the fan for regulating speed of the fan, and a second circuit coupled to the fan and to the first circuit for detecting a fault condition in the fan. A ripple regulator is integrated as the first circuit, and a pulse missing detector circuit is integrated as the second circuit.

With the present invention, a straightforward and cost effective solution for fan speed control and fan fail indication is achieved. These and other advantages of the aspects of the present invention will be more fully understood in conjunction with the following detailed description and accompanying drawings.

DETAILED DESCRIPTION OF THE INVENTION

The present invention relates to speed control and fault detection in fan assemblies. The following description is presented to enable one of ordinary skill in the art to make and use the invention and is provided in the context of a patent application and its requirements. Thus, the present invention is not intended to be limited to the embodiment shown, but is to be accorded the widest scope consistent with the principles and features described herein.

Figure 1:
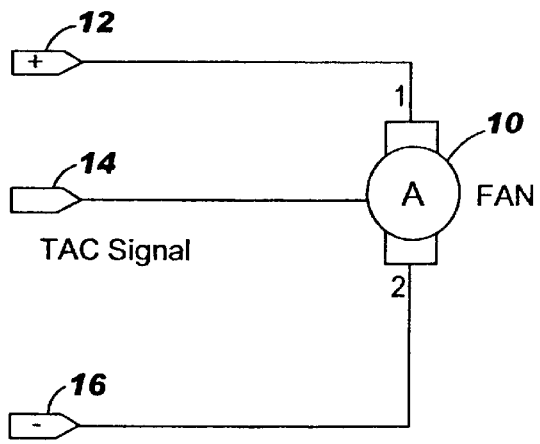
FIG. 1 illustrates a prior art fan assembly.

FIG. 1 illustrates a typical fan 10 having a three wire signal arrangement. A DC (direct current) input provides a power signal at the appropriate voltage for the fan 10 on a first signal 12. A tachometer signal transmits a square wave indicative of the RPM (revolutions per minute) of the fan 10 on a second signal wire 14, and a return signal provides a ground signal for the fan 10 on a third signal wire 16. As shown, for the fan system of FIG. 1, there is no integrated control over how fast the fan 10 runs and no integrated fault detection capabilities.

Figure 2:
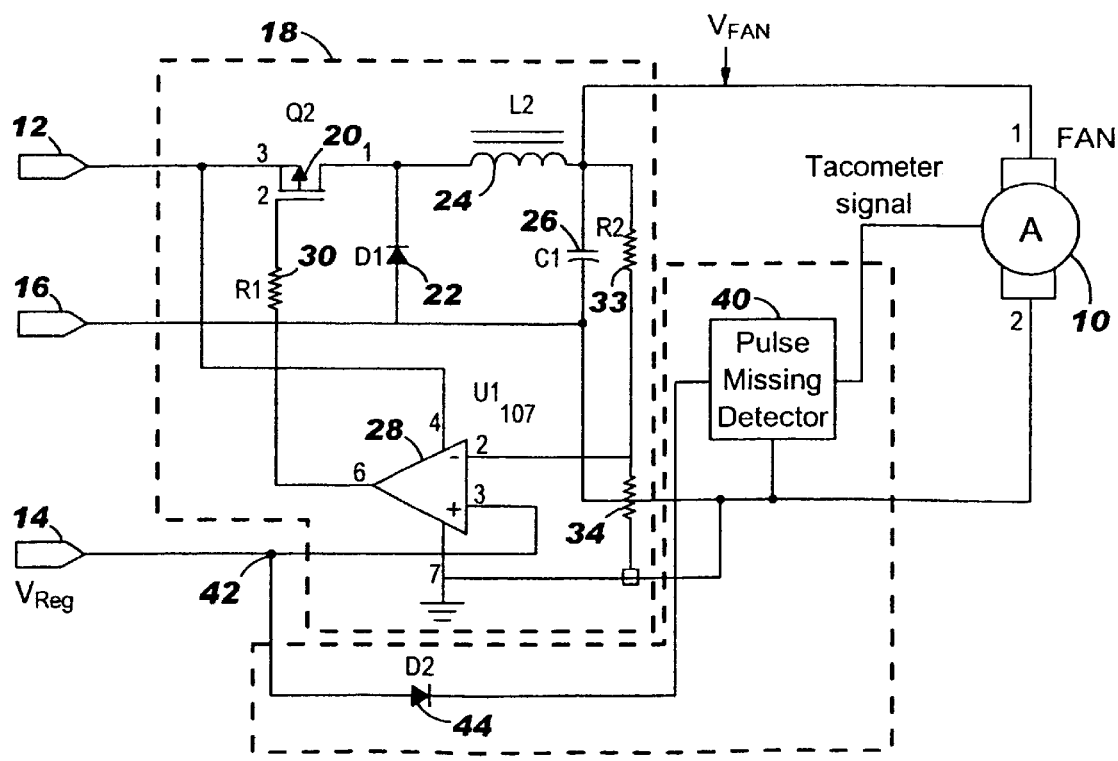
FIG. 2 illustrates a fan assembly with integrated fan speed control and fault detection in accordance with the present invention.

FIG. 2 illustrates a system in accordance with the present invention that is integrated in the fan assembly, or alternatively, embedded on a daughter card that can be attached to a HOT plug-in fan assembly, to regulate fan speed and detect fan failures. The system includes the fan 10, and integrated first and second circuits, 18 and 19. The overall fan assembly with the integrated first and second circuits maintains a three signal wire arrangement, as in the prior art, but utilizes the signal wires in a different manner to control speed and detect faults, as presented hereinbelow.

Regulation of the speed of fan 10 occurs with the inclusion of the first circuit 18 that forms a ripple regulator for the fan 10. The ripple regulator 18 includes a transistor 20 (Q2), a diode 22 (D1), an inductor 24 (L2), a capacitor 26 (C1), a comparator 28 (U1) and resistors 30 (R1), 32 (R2) and 34 (R3). The particular characteristics of the components for the ripple regulator 18 are dependent upon system needs, as is well understood by those skilled in the art. By way of example, L2=5 $\mu$H, C1=47 $\mu$F, R1=100 ohm. The fan voltage ($V_{FAN}$) is controlled by the equation $V_{FAN}=V_{REF}(1+R2/R3)$.

The components of the ripple regulator 18 operate in response to variations in a DC speed control signal provided on the second signal wire 14 of the fan system assembly and applied to the non-inverting input of comparator 28, as is well understood by those skilled in the art. The fan speed is directly proportional to the DC speed control signal, so that if a higher speed for the fan 10 is desired, the speed control DC signal is increased, and conversely, if a lower speed for the fan 10 is desired, the speed control DC signal is decreased. Preferably, the speed control DC signal is provided by a system thermal sense circuit. In this manner, system cooling is managed by varying the speed of the fan which is dependent on system temperature efficiently and effectively within the fan assembly.

In addition, the system includes the second circuit 19 that provides a pulse missing detector circuit. The pulse missing detector 19 is coupled to the ripple regulator 18 at node 42 and isolation from the DC speed control signal is provided by an isolating diode 44. The pulse missing detector circuit 19 operates using standard techniques to compare the frequency of pulses from the fan (tachometer signal) to a chosen reference frequency generated by a built in timer. If there is a fault in the fan, the pulse missing detector circuit 19 detects a difference between the reference frequency and fan frequency and generates a low output signal if the difference is more than a designed threshold. The low output signal pulls the voltage level at the node 42 to low. Since the level of the DC speed control signal is expected at node 42, the non-inverting signal measured (<1 volt) in response to the low level from the pulse missing detector circuit 19 indicates a failure of the fan, such as to a service processor in the system normally associated with the fan monitoring. In this manner, fault detection is integrated within the fan assembly.

Thus, a system and method in accordance with the present invention provides aspects for integrating speed control and fault detection in a fan assembly. The aspects include a fan, a first circuit is coupled to the fan for regulating speed of the fan, and a second circuit coupled to the fan and to the first circuit for detecting a fault condition in the fan. A ripple regulator is integrated as the first circuit, and a pulse missing detector circuit is integrated as the second circuit.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An integrated system for speed control and fault detection in a fan assembly, the integrated system comprising:

a fan having a three signal wire arrangement;

a first circuit coupled to the fan via three signal wires of the three signal wire arrangement for regulating speed of the fan, the first circuit comprising a ripple regulator, the ripple regulator further comprising a transistor coupled to a comparator and further coupled to at least one resistor, a diode, and an inductor, the inductor coupled to a capacitor; and a second circuit coupled to the fan via the three signal wires and to the first circuit for detecting a fault condition in the fan.

2. The integrated system of claim 1 wherein the first circuit is coupled to a power input signal, and a return signal of the fan.

3. The integrated system of claim 1 wherein an output of the ripple regulator varies by varying a speed control DC signal to a non-inverting input of the comparator.

4. The integrated system of claim 2 wherein the second circuit is coupled to a tachometer of the fan.

5. The integrated system of claim 1 wherein the second circuit further comprises a pulse missing detector circuit.

6. The integrated system of claim 5 wherein the pulse missing detector circuit generates a low output signal when there is a fault condition in the fan.

7. The integrated system of claim 6 wherein measurement of the low output signal occurs via the non-inverting input of the comparator.

8. A method for controlling speed and detecting faults in a fan assembly, the method comprising:

integrating a ripple regulator into a fan mechanism to regulate fan speed; and integrating a missing pulse detector into the fan mechanism to detect fan failure conditions, the ripple regulator and missing pulse detector coupled to three signal wires of the fan mechanism, the ripple regulator further comprising a transistor coupled to a comparator and further coupled to at least one resistor, a diode, and an inductor, the inductor coupled to a capacitor.

9. The method of claim 8 wherein integrating a ripple regulator further comprises coupling the ripple regulator to a power signal and return signal.

10. The method of claim 8 wherein integrating the missing pulse detector further comprises coupling the missing pulse detector to a tachometer signal from the fan mechanism.

11. The method of claim 8 further comprising varying a speed control input signal to the ripple regulator to adjust the speed of the fan mechanism.

12. A fan assembly with integrated speed control and fault detection comprising:

a fan including a tachometer output as one signal wire of a three signal wire arrangement;

a ripple regulator coupled to the fan via three signal wires of the three signal wire arrangement, the regulator adjusting the speed of the fan and further comprising a transistor coupled to a comparator and further coupled at least one resistor, a diode, and an inductor, the inductor coupled to a capacitor; and a missing pulse detector circuit coupled to the three signal wires, including the tachometer output of the fan, the missing pulse detector signaling a failure condition in the fan.

13. The fan assembly of claim 12 wherein the ripple regulator is further coupled to a speed control input signal.

14. The fan assembly of claim 13 wherein the ripple regulator adjusts the speed of the fan in response to changes of the speed control input signal.

15. The fan assembly of claim 14 wherein the missing pulse detector circuit pulls the speed control input signal to a low level as a failure indication in the fan.

16. The fan assembly of claim 12 further comprising plug-in means for a card that includes the ripple regulator and missing pulse detector circuit.

* * * * *